Dec. 9, 1969  L. L. PREM  3,483,404
MAGNETOHYDRODYNAMIC GENERATION OF PULSATING ELECTRICITY
Filed Nov. 4, 1965
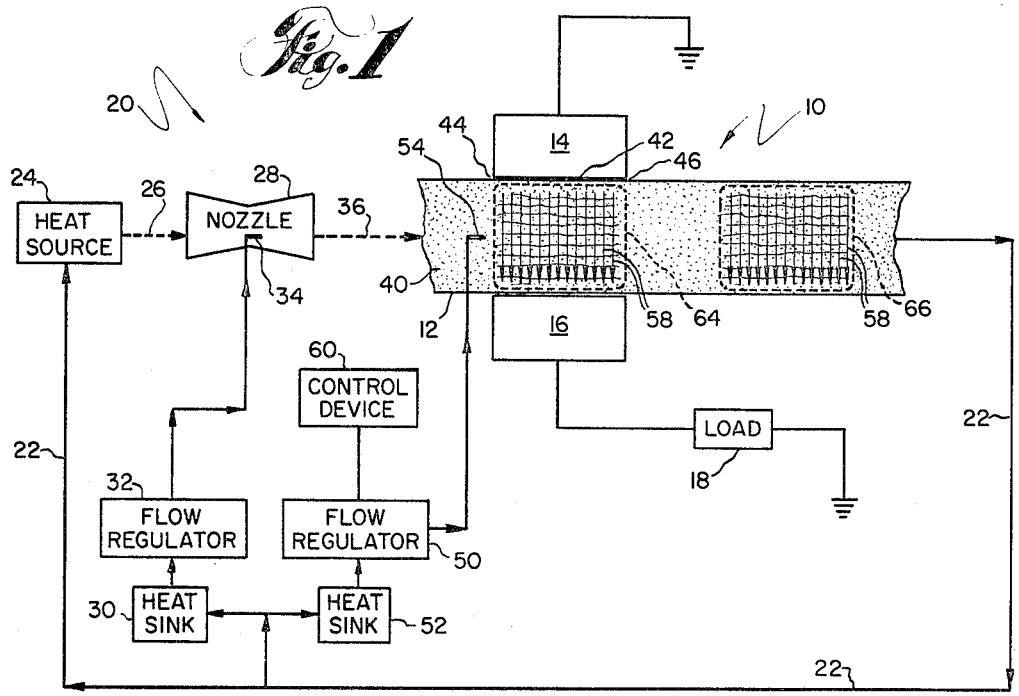
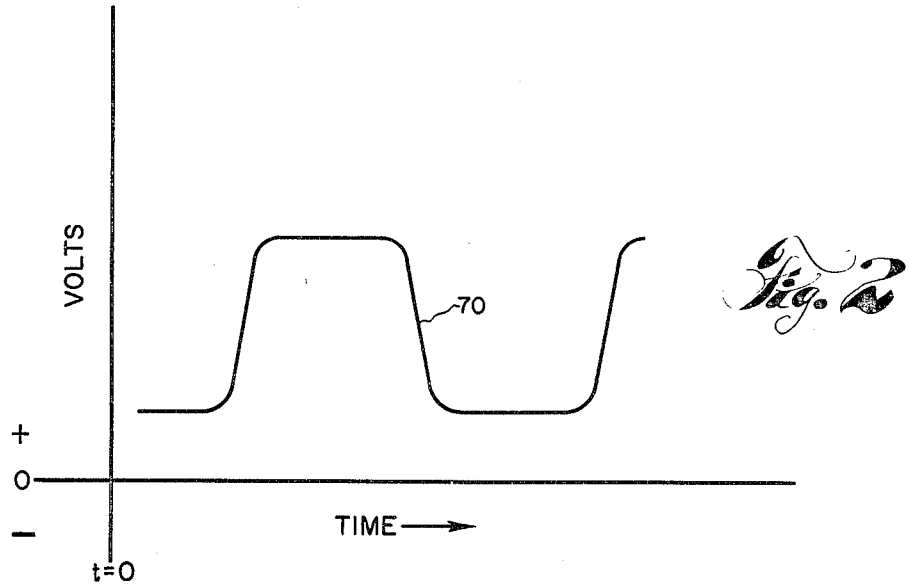
INVENTOR.
LAWRENCE L. PREM
BY
Donald J. Ellingsberg

United States Patent Office 3,483,404
Patented Dec. 9, 1969

3,483,404
MAGNETOHYDRODYNAMIC GENERATION OF PULSATING ELECTRICITY
Lawrence L. Prem, Tarzana, Calif., assignor to North American Rockwell Corporation
Filed Nov. 4, 1965, Ser. No. 506,312
Int. Cl. H02n 4/02
U.S. Cl. 310—11                                  3 Claims

ABSTRACT OF THE DISCLOSURE

A method of and apparatus for generating pulsating electrical current in a magnetohydrodynamic (MHD) generator in which conductive liquid slugs spaced in a nonconductive carrier fluid are passed through a pair of output electrodes and a magnetic field disposed in quadrature.

Background of the invention

MHD generators convert the kinetic energy of an electrically conductive working fluid into electrical energy by moving the working fluid through a primary or applied magnetic field set up across the MHD generator. The interaction of the moving fluid and the primary magnetic field induces an electrical field with current flow in a direction that is mutually perpendicular to both the direction of fluid motion and the magnetic field.

MHD generators can have either a DC or AC power output. It is well known in the prior art to generate a pulsating electrical current output with an MHD generator by interrupting a steady-flow, working fluid passing through the generator into a turbulent flow of spaced-apart slugs. For example, see U.S. Patent No. 3,127,528 to E. C. Lary et al., and U.S. Patent No. 1,916,076 to E. Rupp. Turbulent flow through a MHD generator is undesirable since the generator experiences a power loss because of friction losses when slug flow occurs. Thus, altering the steady-flow or hydrodynamic characteristics of the working fluid as the fluid passes through the MHD generator is highly undesirable since it significantly increases those hydrodynamic problems normally associated with MHD generators, and decreases the overall generator efficiency.

Objects of the invention

Accordingly, it is an object of the present invention to provide a new and improved method of and apparatus for generating a pulsating electrical output from a MHD generator.

A further object is to provide a method of and apparatus for generating a pulsating electrical current output from a MHD generator without significantly altering the steady-flow characteristics of a working fluid.

Summary of the invention

Briefly, in accordance with my invention, a new and improved method of and apparatus for controlling the electrical conductivity of a working fluid in a MHD generator is provided wherein the periodic injection of a predetermined volume of fluid into a steady-flow working fluid at least at the entrance region of the MHD generator alters the electrical conductivity of the working fluid so that a pulsating electrical current is generated without an appreciable effect on the steady hydrodynamic characteristics of the working fluid.

One particular form of magnetohydrodynamic energy conversion system in which my present invention can find particular use is disclosed in my co-pending application S.N. 506,311, filed Nov. 4, 1965, and U.S. Patent No. 3,320,444, issued May 16, 1967, both assigned to the same assignee as the present invention.

Further objects, features, and the attending advantages of the invention will become more readily apparent when the following description is read in view of the accompanying drawing.

Brief description of the drawing

FIGURE 1 is a schematic of a new and improved MHD generator formed in accordance with the present invention and connected into a magnetohydrodynamic energy conversion system; and FIGURE 2 is a graph of one form of electromagnetic waveform developed by the MHD generator of FIGURE 1.

Description of the invention

Referring to FIGURE 1, a preferred form of MHD generator 10 has a suitable conduit 12 positioned between external conductors or current collectors 14 and 16. The current collectors can be, for example, either electrodes or induction coils or the like. Current collectors 14 and 16 are electrically connected to an external load 18 in a conventional manner. Conduit 12 is connected to a magnetohydrodynamic system 20 which is similar to that described in U.S. Patent No. 3,320,444.

Conduit 22 of the magnetohydrodynamic system 20 introduces a working fluid containing one or more components, at least one of which is vaporizable, into a suitable and conventional heat source 24. The working fluid is raised to a temperature equal to or higher than the vaporization temperature thereof by the heat source 24 so that the working fluid is partially vaporized and in the system as shown becomes a two-phase mixture, i.e. having both vapor and liquid phases. The two-phase working fluid passes as a vapor-rich mixture, as schematically shown by dashed line 26, to a nozzle means 28 which increases the kinetic energy of the working fluid. The vapor phase entering the nozzle means 28 can be either wet, saturated, or superheated. The nozzle means 28 converts the thermal energy of the partially vaporized working fluid into kinetic energy so that a high velocity, working fluid stream results.

In the preferred magnetohydrodynamic system 20 as shown, a liquid portion of the working fluid passing through conduit 22 to the heat source 24 is fed to a conventional heat sink 30 which subcools the liquid. A separate source of liquid is also contemplated. The subcooled liquid is conducted through a pressure or flow regulator 32 and injected into the nozzle means 28 at point 34. The injection of subcooled liquid is controlled by the regulator 32 so that the resulting working fluid passing from the nozzle means 28 has been adjusted and is vapor rich; for example, approximately 70% vapor as schematically shown by dashed line 36. A vapor-rich fluid is a relatively inferior or poor electrical conductor since the molecules of the liquid phase are widely separated by the vapor phase. In a liquid-rich fluid, the molecules of the liquid phase are compact and the fluid is, therefore, a relatively superior or good electrical conductor. The vapor-rich working fluid passing from nozzle means 28 is a relatively inferior electrical conductor as schematically indicated at 40.

Conduit 12 passes this vapor-rich working fluid 40 perpendicular to a plane defined by the current collectors 14 and 16, and also perpendicular to a primary magnetic field that is set up across the generator region 42 of the MHD generator 10 by a conventional magnetic means such as magnetic poles (not shown) spaced apart by the conduit and normal to the plane of the drawing. The collectors 14 and 16 and the magnetic means define an entrance region 44 and exit region 46. The fluid flow, the external conductors, and the primary magnetic field are mutually perpendicular in accordance with conventional MHD generator principles.

It is well known, however, that the generator region 42 of MHD generator 10 must "see" an electrically conductive working fluid to generate an electrical current. That is, the working fluid within the generator region 42 must be a relatively superior electrical conductor such as a liquid-rich fluid. Since the electrical conductivity of the working fluid at the entrance region 44 of the MHD generator 10 is relatively inferior or poor, the electrical characteristics of the working fluid must again be altered so that the working fluid becomes a relatively superior or good electrical conductor as the fluid passes through the generator region 42.

The electrical characteristics of the working fluid are altered from a relatively inferior electrical conductor (vapor-rich fluid) to a relatively superior electrical conductor (liquid-rich fluid) by the controlled injection of liquid, preferably subcooled, into the stream of vapor-rich working fluid 40. A flow or pressure regulator 50 controls the conditions for the injection of a predetermined volume of liquid that passes from conduit 22 through a conventional heat sink 52. Heat sink 52 is similar to heat sink 30. It is contemplated that heat sink 52 can be eliminated where the system parameters do not require additional heat exchange capacity. It is also contemplated that each flow regulator 32 and 50 could receive liquid from a common heat sink. The injection of liquid is generally at point 54 which is adjacent the entrance region 44 of the MHD generator 10. The liquid injection at point 54 is preferably in a direction that is parallel to the flow of direction of the working fluid. However, injection in the opposite direction or at an angle to the flow direction is also contemplated. Multiple injections at or near the entrance region 44 can also be used.

The controlled injection of liquid at 54 increases the liquid percent of the total volume of the working fluid and decreases the vapor percent volume so that the resulting working fluid becomes liquid rich and, therefore, a relatively superior electrical conductor as the fluid passes through the generator region 42. The electrical current flow generated within the generator region 42 is generally indicated by the arrows 58.

It is contemplated that the vapor percent of the working fluid could be decreased at the entrance region 44 of the MHD generator 10 by increasing the working pressure at the entrance region; for example, by decreasing the cross-sectional area of conduit 12. The pressure increase would decrease the vapor percent and, therefore, alter the electrical characteristics of the working fluid from a relatively inferior electrical conductor (vapor-rich fluid) to a relatively superior electrical conductor (liquid-rich fluid). This increase in working fluid pressure at the entrance region can be accomplished in accordance with well-known hydrodynamic principles. It is also contemplated that the increase in working fluid pressure at the entrance region of the MHD generator could cooperate with the controlled injection of liquid at the entrance region to the MHD generator as previously described and shown.

The injection of liquid at 54 into the stream of vapor-rich working fluid 40 is controlled by flow regulator 50 and timed by a suitable and conventional control device 60 so that each period of liquid injection matches the system parameters to develop a pulsating electrical current output from the MHD generator 10.

Operatively, the control device 60 is set to periodically actuate the flow regulator 50 so that the periods of liquid injection at 54 correspond to a desired frequency. The working fluid therefore becomes alternately a relatively superior electrical conductor and a relatively inferior electrical conductor as the fluid passes through the generator region 42. The periodic injection of liquid into the working fluid develops spaced-apart, electrically conductive "slugs" or liquid magnet dipoles. Two such slugs are generally indicated within conduit 12 by the dashed lines 64 and 66.

Referring now to FIGURES 1 and 2, the electrically conductive slugs 64 and 66 generate electromagnetic wave form 70 as the slugs pass through the MHD generator region 42. Wave form 70 is an example of one form of pulsating electrical energy that can be generated by the improved MHD generator of my invention. Other wave forms can be generated by varying, for example, the period and amount of fluid injected at point 54.

As will be evidenced from the foregoing description, certain aspects of my invention are not limited to the particular details of construction as illustrated, and it is contemplated that other modifications and applications other than those described herein will occur to those skilled in the art. It is, therefore, intended that the appended claims shall cover such modifications and applications that do not depart from the true spirit and scope of the invention.

What is claimed is:

1. In an improved magnetohydrodynamic generator, the method of generating electricity comprising:
   (a) passing an electrically non-conductive working fluid having liquid and vapor phases through a magnetic field,
   (b) periodically altering the electrical characteristics of said working fluid by periodically injecting a predetermined volume of liquid into the working fluid adjacent the entrance region of the magnetic field so that the working fluid is alternately electrically conductive and electrically nonconductive within the magnetic field, and
   (c) extracting pulsating electrical energy from the interaction of the periodically conductive working fluid and the magnetic field.

2. An improved magnetohydrodynamic energy conversion system for generating pulsating electricity comprising:
   (a) a working fluid having at least one vaporizable component,
   (b) a heat source vaporizing a portion of said working fluid,
   (c) nozzle means in fluid comunication with said heat source changing the thermal energy of said partially vaporized working fluid to kinetic energy,
   (d) at least one source of liquid,
   (e) first regulator means in fluid communication with said source of liquid,
   (f) first injection means cooperating with said nozzle means and injecting a predetermined volume of liquid from said first regulator means so that a high velocity, electrically nonconductive working fluid passes from said nozzle means,
   (g) a generator means having a magnetic field and external conductors positioned generally perpendicular to each other,
   (h) conduit means cooperating with said nozzle means and said generator means and passing said working fluid from said nozzle means in a flow direction generally perpendicular to each of the magnetic field and the external conductors,
   (i) an entrance region and an exit region in said conduit means defined by and spaced apart by at least the magnetic field,
   (j) second regulator means in fluid communication with said source of liquid, and
   (k) second injection means cooperating with said entrance region and periodically injecting a predetermined volume of liquid from said second regulator means into said electrically non-conductive fluid so that the working fluid is alternately electrically conductive and electrically non-conductive within the magnetic field,
(1) said generator means extracting pulsating electrical energy from said periodically electrically conductive working fluid.

3. The improved magnetohydrodynamic energy conversion system of claim 2 in which said liquid is subcooled.

References Cited

UNITED STATES PATENTS 3,080,515  3/1963  Kehoe _____ 322—2

FOREIGN PATENTS 648,937  8/1937  Germany.

DAVID X. SLINEY, Primary Examiner